(12) United States Patent
Zhang et al.

(10) Patent No.: US 9,779,294 B2
(45) Date of Patent: Oct. 3, 2017

(54) METHODS AND DEVICES FOR CLASSIFYING PICTURES

(71) Applicant: Xiaomi Inc., Beijing (CN)

(72) Inventors: Tao Zhang, Beijing (CN); Fei Long, Beijing (CN); Zhijun Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 1 day.

(21) Appl. No.: 14/932,561

(22) Filed: Nov. 4, 2015

(65) Prior Publication Data

US 2016/0189008 A1   Jun. 30, 2016

Related U.S. Application Data

(63) Continuation of application No. PCT/CN2015/078114, filed on Apr. 30, 2015.

(30) Foreign Application Priority Data

Dec. 31, 2014   (CN) .......................... 2014 1 0851146

(51) Int. Cl.
G06K 9/48   (2006.01)
G06K 9/00   (2006.01)

(52) U.S. Cl.
CPC ................ *G06K 9/00456* (2013.01)

(58) Field of Classification Search
CPC .... G06K 9/6269; G06K 9/628; G06K 9/6286; G06K 9/42; G06K 9/00268; G06K 9/4614
See application file for complete search history.

(56) References Cited

U.S. PATENT DOCUMENTS

| 6,853,755 | B2 | 2/2005 | Li |
| 8,334,920 | B2 | 12/2012 | Seto |
| 8,781,175 | B2 * | 7/2014 | Wang ................. G06K 9/00624 382/112 |
| 8,958,119 | B2 | 2/2015 | Kawaguchi |
| 8,995,725 | B2 * | 3/2015 | Li ...................... G06K 9/00624 382/112 |
| 9,008,416 | B2 * | 4/2015 | Movellan ........... G06K 9/00302 382/159 |

(Continued)

FOREIGN PATENT DOCUMENTS

| CN | 101848354 A | 9/2010 |
| CN | 102253935 A | 11/2011 |

(Continued)

OTHER PUBLICATIONS

Chih-Fong, Tsai, "On Classifying Digital Accounting Documents," The International Journal of Digital Accounting Research, National Chung Cheng University. Taiwan, ROC, vol. 7, N. 13, 2007, pp. 53-71.

(Continued)

*Primary Examiner* — Ali Bayat
(74) *Attorney, Agent, or Firm* — Quarles & Brady LLP

(57) ABSTRACT

Methods and devices are provided for classifying pictures. In the method, the device obtains a picture to be classified. The device determines a class of the picture according to feature information of the picture, in which the class includes a text picture class and a non-text picture class. The device classifies the picture according to the class of each picture.

18 Claims, 7 Drawing Sheets

(56) References Cited

U.S. PATENT DOCUMENTS

| | | | |
|---|---|---|---|
| 9,053,431 B1 * | 6/2015 | Commons | G06N 3/0454 |
| 9,058,611 B2 * | 6/2015 | Saunders | G06Q 30/02 |
| 9,088,765 B2 | 7/2015 | Seto | |
| 9,171,013 B2 * | 10/2015 | Gokturk | G06F 17/30253 |
| 9,171,231 B2 * | 10/2015 | Naaman | G06F 17/30241 |
| 2002/0168105 A1 | 11/2002 | Li | |
| 2005/0055451 A1 | 3/2005 | Tsuyama et al. | |
| 2010/0220927 A1 | 9/2010 | Kim et al. | |
| 2010/0245652 A1 | 9/2010 | Seto | |
| 2010/0306175 A1 | 12/2010 | Johnson et al. | |
| 2010/0306176 A1 | 12/2010 | Johnson et al. | |
| 2010/0306180 A1 | 12/2010 | Johnson et al. | |
| 2010/0306283 A1 | 12/2010 | Johnson et al. | |
| 2013/0101268 A1 | 4/2013 | Seto | |
| 2014/0146328 A1 | 5/2014 | Kawaguchi | |
| 2014/0201126 A1 * | 7/2014 | Zadeh | G06K 9/627 706/52 |
| 2014/0365310 A1 * | 12/2014 | Movellan | G06Q 30/0269 705/14.66 |

FOREIGN PATENT DOCUMENTS

| | | |
|---|---|---|
| CN | 103412753 A | 11/2013 |
| CN | 103856686 A | 6/2014 |
| EP | 1489515 A1 | 12/2004 |
| JP | H8-320819 A | 12/1996 |
| JP | 2009-110477 A | 5/2009 |
| JP | 2009-123020 A | 6/2009 |
| JP | 2012-88992 A | 5/2012 |
| KR | 10-2010-0099005 A | 9/2010 |
| RU | 2254610 C2 | 6/2005 |

OTHER PUBLICATIONS

International Search Report issued in corresponding International Application No. PCT/CN2015/078114, mailed Sep. 25, 2015, 2015, 5 pages.

Written Opinion (including English translation) issued in corresponding International Application No. PCT/CN2015/078114, mailed Sep. 25, 2015, 4 pages.

Extended European Search Report issued in corresponding EP Application No. 15200908, dated May 30, 2016, 8 pages.

Office Action (including English translation) issued in corresponding Korean Patent Application No. 10-2015-7026988, dated Oct. 21, 2016, 8 pages.

Office Action (including English translation) issued in corresponding Japanese Patent Application No. 2016-567116, dated Mar. 21, 2017, 10 pages.

Office Action (including English translation) issued in corresponding Chinese Patent Application No. 201410851146.7, dated May 31, 2017, 12 pages.

Office Action issued in corresponding Russian Patent Application No. 2015133980/08(052253), dated Jun. 20, 2017, 6 pages.

* cited by examiner

METHODS AND DEVICES FOR CLASSIFYING PICTURES

CROSS-REFERENCE TO RELATED APPLICATIONS

This application is a continuation application of International Application No. PCT/CN2015/078114, filed with the State Intellectual Property Office of P. R. China on Apr. 30, 2015, which is based on and claims priority to Chinese Patent Application No. 201410851146.7 filed on Dec. 31, 2014, the entire contents of which are incorporated herein by reference.

TECHNICAL FIELD

The present disclosure generally relates to a picture processing technical field, and more particularly, to a method and a device for classifying pictures.

BACKGROUND

When a person is having classes or participating in activities, he or she usually needs to record some important text information, such as important course contents, activity rules, and contacts. The user may take a photo of the text information by a terminal having a camera to facilitate subsequent view.

Since the terminal displays pictures according to storage time of the pictures, if the text pictures which the user needs to view are separated by non-text pictures, the view efficiency will be reduced.

SUMMARY

In order to overcome problems that text pictures are separated by non-text pictures when a terminal displays pictures according to their storage time, which reduces an efficiency of viewing text pictures, the present disclosure provides methods and devices for classifying pictures.

According to embodiments of a first aspect of the present disclosure, there is provided a method for classifying pictures, including: obtaining a picture to be classified; determining a class of the picture according to feature information of the picture, in which the class includes a text picture class and a non-text picture class; classifying the picture according to the class of the picture.

According to embodiments of a second aspect of the present disclosure, there is provided a device for classifying pictures, including: a picture obtaining module, configured to obtain a picture to be classified; a class determining module, configured to determine a class of the picture according to feature information of the picture obtained by the picture obtaining module, in which the class comprises a text picture class and a non-text picture class; a picture classifying module, configured to classify the picture according to the class of the picture determined by the class determining module.

According to embodiments of a third aspect of the present disclosure, there is provided a device for classifying pictures, including a processor and a memory configured to store instructions executable by the processor, in which the processor is configured to: obtain a picture to be classified; determine a class of the picture according to feature information of the picture, in which the class comprises a text picture class and a non-text picture class; classify the picture according to the class of the picture.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The technical solution provided by embodiments of the present disclosure may have the following advantageous effects: by obtaining pictures to be classified, by determining a class of each picture according to feature information of the picture, in which the class includes a text picture class and a non-text picture class, and by classifying the pictures according to the class of each picture, the pictures may be classified in term of text picture class and non-text picture class, such that all the pictures in the text picture class are text pictures, which solves the problem of low view efficiency caused by separating the text pictures by the non-text pictures when the terminal displays the pictures according to their storage time, thus enhancing the efficiency of viewing the text pictures.

Figure 1:
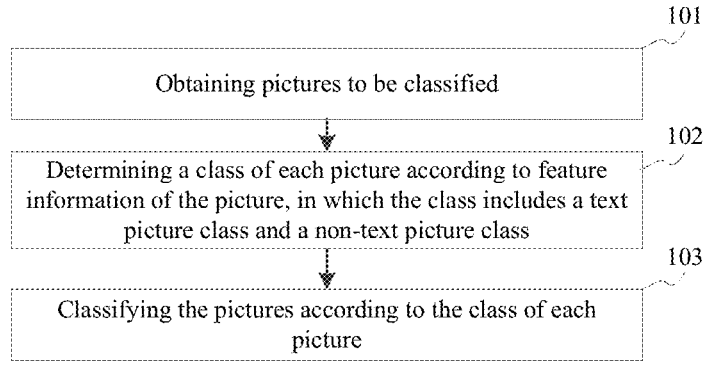
FIG. 1 is a flow chart of a method for classifying pictures according to an exemplary embodiment.

FIG. 1 is a flow chart of a method for classifying pictures according to an exemplary embodiment. The method for classifying pictures is applied in a terminal and as shown in FIG. 1, the method may include the following steps.

In step 101, a picture to be classified is obtained. For example, the terminal may obtain one or more pictures from its own storage.

In step 102, a class of the picture is determined according to feature information of the picture, where the class may include a plurality of different classes which include a text picture class and a non-text picture class. Alternatively or additionally, the terminal may set the different classes based on user inputs or automatic image recognition methods. The feature information may include Gabor feature value, the gradient direction value, etc.

In step 103, the terminal may classify the picture at least partially according to the class of the picture. For example, the terminal may classify pictures including similar texts into a first class. The terminal may classify pictures including similar human faces into a second class. The terminal may classify pictures including similar animals into a third class. The terminal may classify pictures including similar plants into a fourth class.

In conclusion, with the method for classifying pictures provided by the present disclosure, by obtaining the pictures to be classified, by determining the class of each picture according to feature information of the picture, in which the class includes the text picture class and the non-text picture class, and by classifying the pictures according to the class of each picture, the pictures may be classified at least partially based on the feature information. For example, the pictures may be classified in term of the text picture class and the non-text picture class, such that all the pictures in the text picture class are text pictures, thus solving the problem of low view efficiency caused by separating text pictures by non-text pictures when the terminal displays the pictures according to their storage time and realizing an effect of enhancing the view efficiency.

Figure 2A:
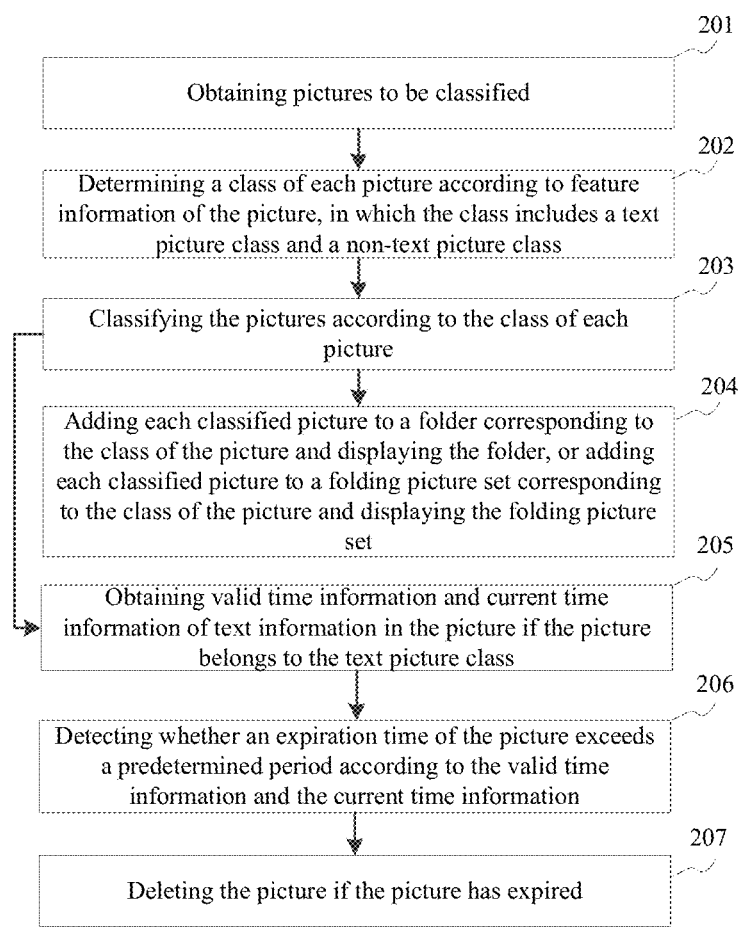
FIG. 2A is a flow chart of a method for classifying pictures according to another exemplary embodiment.

FIG. 2A is a flow chart of a method for classifying pictures according to another exemplary embodiment. As shown in FIG. 2A, the method for classifying pictures may be implemented in a terminal device and may include following steps.

In step 201, one or more pictures to be classified are obtained.

The pictures are pictures stored in the terminal, and may include text pictures and non-text pictures. The text pictures are pictures containing text information, and the non-text pictures are pictures except the text pictures.

Figure 2B:
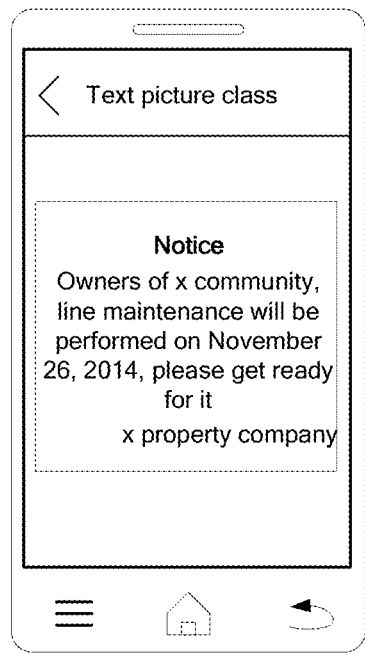
FIG. 2B is a schematic diagram showing a text picture according to another exemplary embodiment.

FIG. 2B shows a schematic diagram of a text picture, which is a text picture obtained by taking a photo of a notice. The text picture includes a title of "Notice", a content of "owners in x community, line maintenance will be performed on Nov. 26, 2014, please get ready for it" and a notice publisher of "x property company."

In step 202, a class of each picture is determined according to the feature information of the picture, in which the class includes a text picture class and a non-text picture class.

Since the text picture includes text information and the non-text picture includes graphic information, the terminal may determine the class of the picture according to the feature information of the text information and graphic information, in which the feature information may be a Gabor feature value or a gradient direction value.

The step of determining the class of the picture according to the feature information of the picture may include following steps:

1) extracting the feature information of each pixel in the picture;
2) determining the feature information according to a SVM (Support Vector Machine) model, in which the SVM model is obtained by training sample pictures, and the sample pictures include text pictures and non-text pictures;
3) determining the class of the picture according to the determining result.

During extracting the feature information, since a Chinese character is formed by strokes such as a horizontal stroke, a vertical stroke, a left-falling stroke and a right-falling stroke, when the feature information includes the Gabor feature value, the weight of the Chinese character can be divided into five grades, and the direction of the stroke can be divided into eight grades, and thus for each pixel in the picture, a 40-dimensional Gabor feature value can be calculated; when the feature information includes the gradient direction value, the gradient direction value of each pixel can be calculated according to the coordinate of the pixel. The feature information of the picture may include all or a part of feature information of each pixel in the picture.

The terminal may also obtain the SVM model, and input the extracted feature information to the SVM model for determining the class of the picture by the SVM model according to the feature information, and then output the determining result. The determining result is configured for indicating that the picture is a text picture, or the determining result is configured for indicating that the picture is a non-text picture.

The terminal may obtain the SVM model in advance, and then determine the class of the picture according to the SVM model and the feature information. The terminal may obtain the SVM model in many ways. For example, if the terminal has a strong processing capacity, the terminal may train the sample pictures to obtain the SVM model. For another example, if the terminal has a weak processing capacity, the terminal may obtain the SVM model from a server, in which the SVM model is obtained after training the sample pictures by the server. Alternatively or additionally, the terminal may not obtain the SVM model, but send the feature information to the server for determining the class of the picture by the server according to the SVM model and the feature information, and then the terminal receives the class fed back by the server, in which the SVM model is obtained by the server after training the sample pictures.

In this embodiment, take training the sample pictures by the terminal to obtain the SVM model as an example, the method for classifying pictures may further includes:

1) normalizing resolutions of the sample pictures to a predetermined resolution;
2) extracting feature information of each pixel in each normalized sample picture;

3) calculating a histogram of the feature information in each sample picture block, in which the sample picture block is obtained by dividing an area of the sample picture; and 4) obtaining the SVM model according to types of the sample pictures and the histograms.

First, the terminal needs to obtain a first number of text pictures and a second number of non-text pictures, and determines the text pictures and non-text pictures as sample pictures. The more the sample pictures are, the more accurate the SVM model obtained by training is, and the more the resources consumed by training are. Thus, the number of sample pictures is selected according to actual requirements. For example, the first number may be fifty thousand, and the second number may be one hundred thousand.

Second, since the resolutions of the sample pictures are different from each other, the same sample picture blocks include different numbers of pixels, such that the calculated histogram is not accurate. Thus, the terminal needs to normalize the resolutions of the sample pictures to the predetermined resolution. The predetermined resolution may be set by the terminal, for example, the predetermined resolution may be 300*300 DPI (Dots Per Inch) or other values, which is not limited herein.

Third, the terminal extracts the feature information of the normalized sample pictures, to obtain the Gabor feature value of each pixel, or to obtain the gradient direction value of each pixel.

Fourth, for each sample picture, the terminal may calculate the feature information of the sample picture to obtain one histogram, in which the histogram is configured to represent the distribution of feature information in the sample picture.

Figure 2C:
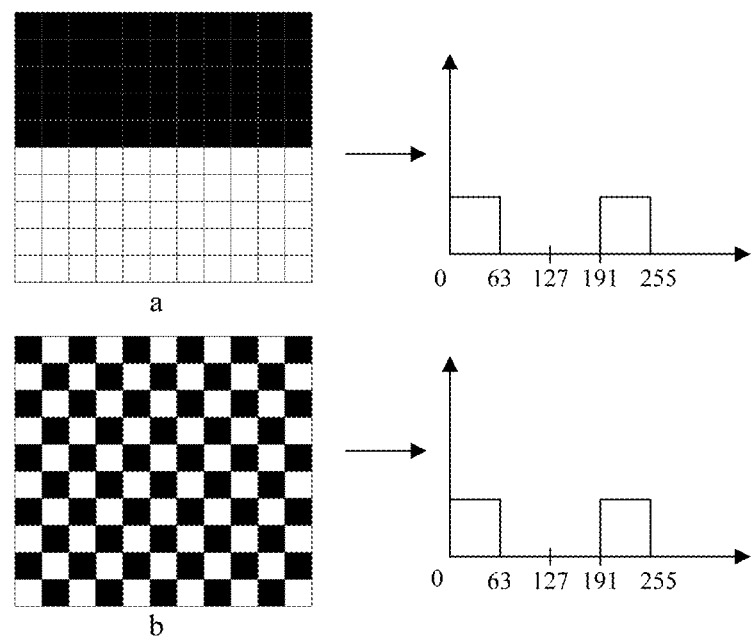
FIG. 2C is a schematic diagram showing a first histogram of a sample picture according to another exemplary embodiment.

The feature information in this embodiment may include the Gabor feature value, the gradient direction value, or other feature values to measure image similarities. Since it is not easy to intuitively represent the Gabor feature value and the gradient direction value in drawings, in this embodiment, the calculation of the histogram is illustrated by taking the gray values of the pixels as the feature information and assuming that the resolution of sample picture a is identical with that of sample picture b. Please refer to the first histogram of the sample picture shown in FIG. 2C, in which it is assumed that an upper half of the sample picture a consists of black pixels, a lower half of the sample picture a consists of white pixels, and each two black pixels in the sample picture b are separated by one white pixel. Assuming that intervals in the histogram are [0, 63], (63, 127], (127, 191] and (191, 255], then in the histogram of the sample picture a, an area of the interval [0, 63] is 0.5 and an area of the interval (191, 255] is 0.5, and in the histogram of the sample picture b, an area of the interval [0, 63] is 0.5 and an area of the interval (191, 255] is 0.5. That is, the histogram of the sample picture a is the same as that of the sample picture b, but the sample picture a is different from the sample picture b. Thus, it can be seen that, the more the calculated feature information is, the more similar the distributions of the feature information is.

Figure 2D:
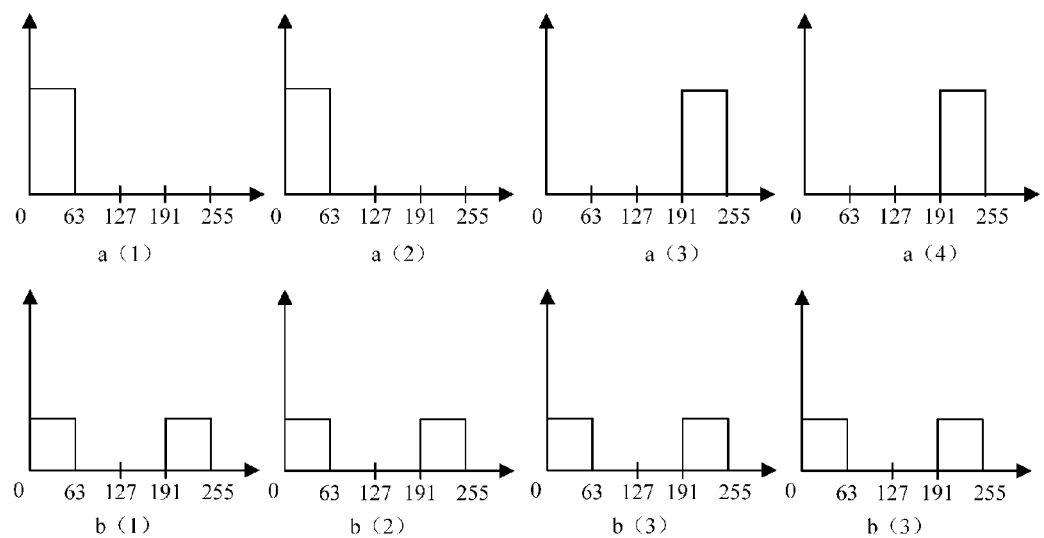
FIG. 2D is a schematic diagram showing a second histogram of a sample picture according to another exemplary embodiment.

In order to avoid the problem that the distributions of the feature information are similar when there are too much feature information, the terminal may divide the area of the sample picture to obtain sample picture blocks, and then calculates the histogram of the feature information in the sample picture block. Assuming that the sample picture is divided into four sample picture blocks with the same size, then for the sample picture a, the area of the interval [0, 63] in the first sample picture block is 1, the area of the interval [0, 63] in the second sample picture block is 1, the area of the interval (192, 255] in the third sample picture block is 1, the area of the interval (192, 255] in the fourth sample picture block is 1; for the sample picture b, the area of the interval [0, 63] in each sample picture block is 0.5, and the area of the interval (192, 255] in each sample picture block is 0.5, referring to the second histograms of the sample pictures shown in FIG. 2D. That is, the histogram of the sample picture a is different from that of the sample picture b.

It should be noted that, in the above illustration, take dividing the sample picture into 2*2 sample picture blocks as an example, however, in practical implementations, the number of sample picture blocks may be determined according to actual needs, which is not limited herein.

Before calculating the histogram, the intervals of the histogram need to be determined. In this embodiment, take the feature information being the gradient direction value as an example for illustration. Assuming that it is necessary to divide 360° into nine intervals, then the intervals of the histogram may be [0, 40], (40, 80], (80, 120], (120, 160], (160, 200], (200, 240], (240, 280], (280, 320] and (320, 360]. If the coordinate of a certain pixel is (5, 5), then the gradient direction value of the pixel is arctan(y/x)=45°, and the pixel belongs to the interval (40, 80].

Fifth, the terminal generates one vector according to each histogram, and then connects vectors of all the sample picture blocks in each sample picture in a predetermined order, to obtain a vector of the sample picture. Since the terminal knows the type of each sample picture, the terminal may obtain the SVM model according to the types of the sample pictures and the vectors of the sample pictures.

For example, if the vectors of the four sample picture blocks of the sample picture a are [1, 0], [1, 0], [0, 1], [0, 1] respectively, then the vector of the sample picture a is [1, 0, 1, 0, 0, 1, 0, 1]; if the vectors of the four sample picture blocks of the sample picture b are [0.5, 0.5], [0.5, 0.5], [0.5, 0.5], [0.5, 0.5] respectively, then the vector of the sample picture b is [0.5, 0.5, 0.5, 0.5, 0.5, 0.5, 0.5, 0.5].

In step 203, the pictures are classified according to the class of each picture.

The terminal may add a tag of class to the picture, so as to realize the classification. For example, after determining that picture a is the text picture, the terminal sets a tag of "text picture" to picture a; and after determining that picture b is the non-text picture, the terminal sets a tag of "non-text picture" to picture b. Alternatively or additionally, the terminal may only set tags to the text pictures. That is, after determining that picture b is the non-text picture, the terminal does not set a tag to picture b, so as to distinguish it from picture a which is set with the tag.

Alternatively or additionally, the terminal may transfer the picture to a corresponding class, so as to realize the classification. For example, the terminal sets a text picture class and a non-text picture class, and after determining that picture a is the text picture, the terminal transfers picture a to the text picture class; after determining that picture b is the non-text picture, the terminal transfers picture b to the non-text picture class.

In one implementation, the terminal needs to display the classified pictures, at this time the terminal executes step 204. No matter which classification way the terminal uses, the terminal needs to display the pictures according to classes. That is, the terminal displays the text pictures as one class, and displays the non-text pictures as another class, so as to ensure that the text pictures are not separated by the non-text pictures, thus enhancing the efficiency of viewing the text pictures.

In step 204, each classified picture is added to a folder corresponding to the class of the picture, and folders are displayed; or, each classified picture is added to a folding picture set corresponding to the class of the picture, and folding picture sets are displayed.

Figure 2E:
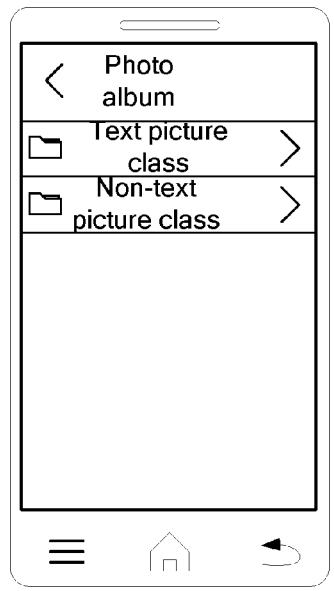
FIG. 2E is a schematic diagram showing a first picture classification according to another exemplary embodiment.

According to the first display mode, the terminal may create the folder corresponding to the text picture class and the folder corresponding to the non-text picture class, add the text pictures to the folder corresponding to the text picture class, add the non-text pictures to the folder corresponding to the non-text picture class, and display these two folders. When the terminal receives an opening instruction triggered by the user through clicking a certain folder, the terminal displays pictures in the folder, referring to the schematic diagram of the first way for displaying picture classification shown in FIG. 2E. The terminal may include additional picture classes based on user input, automatic recognition methods, or a combination of both user input and automatic recognition methods.

Figure 2F:
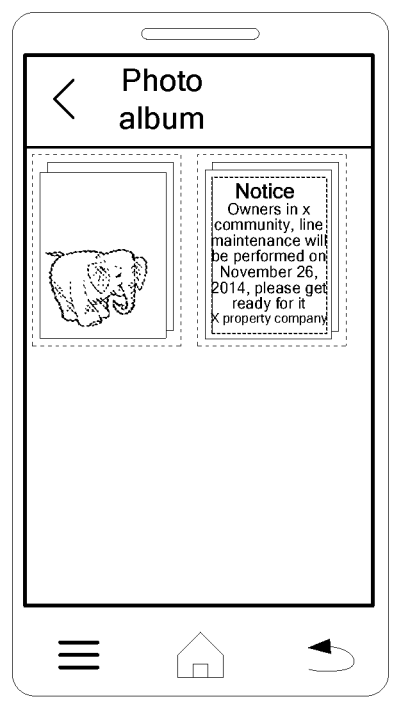
FIG. 2F is a schematic diagram showing a second picture classification according to another exemplary embodiment.

According to the second display mode, the terminal may add the text pictures to the folding picture set corresponding to the text picture class, add the non-text pictures to the folding picture set corresponding to the non-text picture class, and displays these two folding picture sets. When the terminal receives an opening instruction triggered by the user through clicking a certain folding picture set, the terminal displays pictures in the folding picture set, referring to the schematic diagram of the second way for displaying picture classification shown in FIG. 2F.

The step of displaying the folding picture set may include following steps:

1) extracting a representation picture with a best quality from the folding picture set, or extracting a representation picture with a latest storage time from the folding picture set;

2) displaying the representation picture of the folding picture set without displaying other pictures in the folding picture set, or displaying the representation picture of the folding picture set and edge portions of other pictures in the folding picture set.

When displaying the folding picture set, the terminal may select a default picture from pictures outside the folding picture set, and use the default picture as the representation picture of the folding picture set. Alternatively or additionally, the terminal may select a picture from the folding picture set and use this picture as the representation picture of the folding picture set, such that the user may intuitively determine the type of pictures included in the folding picture set.

When selecting the representation picture from the folding picture set, the terminal may optionally select any picture from the folding picture set as the representation picture. Alternatively or additionally, the terminal may select the picture with the best quality from the folding picture set as the representation picture, so as to enhance the distinguishing degree of the pictures. Alternatively or additionally, the terminal may select the picture with the latest storage time from the folding picture set as the representation picture, so as to enhance the real-time performance of the folding picture set.

Figure 2G:
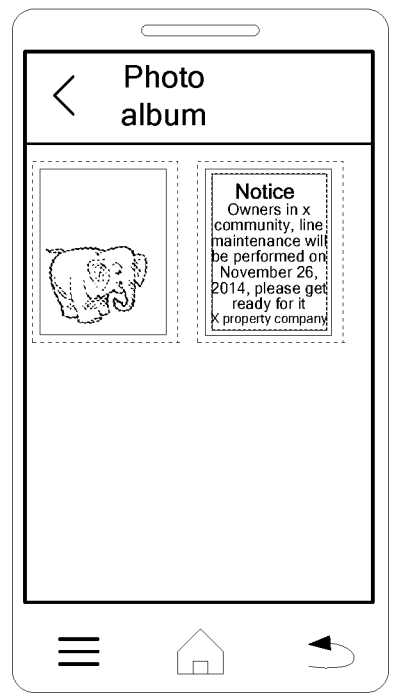
FIG. 2G is a schematic diagram of displaying folding picture sets according to another exemplary embodiment.

Refer to the schematic diagram of displaying the folding picture sets shown in FIG. 2G, after selecting the representation picture, the terminal may only display the representation picture without displaying other pictures in the folding picture set. Alternatively or additionally, the terminal may display the representation picture and edge portions of other pictures, referring to FIG. 2F.

It should be noted that, before displaying the picture classification, the terminal may also display selection information of "displaying pictures in the form of folders" and "displaying pictures in the form of folding picture sets", and determine the way of displaying the picture classification according to the user's selection.

After displaying the picture classification, the terminal may also manage the pictures in the text picture class according to the user's operation. For example, the terminal may receive a deleting instruction from the user for deleting an expired picture, and delete the picture according to the deleting instruction. The expired picture refers to the picture in which the text information is invalid. Still take the picture shown in FIG. 2B as an example, the valid time of the text information in the picture is Nov. 26, 2014, so as to prompt the user to get ready for line maintenance on that day. When the current time exceeds the valid time, the line maintenance has already been completed, and thus the picture loses the prompt value for the user and becomes an expired picture.

Since it consumes a long time for the user to delete the expired pictures one by one, the terminal may also detect the expired pictures and delete the expired pictures, at this time the terminal executes steps 205-207.

In step 205, if the picture belongs to the text picture class, the valid time information and current time information of the text information in the picture are obtained.

The terminal may obtain the valid time information from the picture, the terminal may also obtain the current time information from a system, and process the picture according to the valid time information and the current time information. The valid time information is configured to indicate the due time after which the text information in the picture does not have the prompt value for the user. For example, the valid time information in FIG. 2B is Nov. 26, 2014.

The step of obtaining the valid time information and current time information of the text information in the picture may include following steps:

1) reading the valid time information from the text recorded in the picture, or receiving inputted valid time information when storing the picture; and 2) obtaining the current time information.

The terminal may extract the text information from the picture by methods such as OCR (Optical Character Recognition), and then extract time information from the text information according to keywords such as "year", "month", "date", "hour", "minute" and "second", and determine the time information as the valid time information.

Figure 2H:
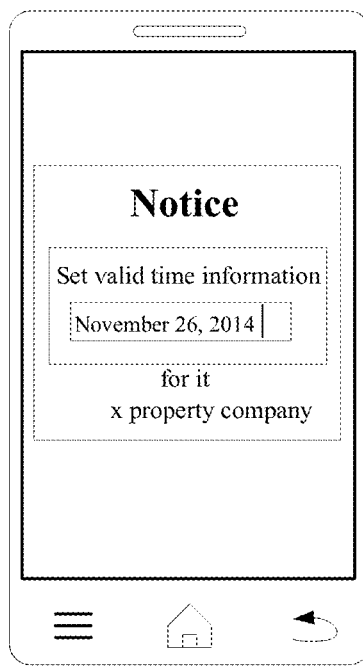
FIG. 2H is a schematic diagram of setting valid time information according to another exemplary embodiment.

Alternatively or additionally, when storing the picture, the terminal may display an input box for setting the valid time information to the user, receive the time information inputted by the user in the input box, and determine the time information as the valid time information. Refer to the schematic diagram of setting the valid time information shown in FIG. 2H, after taking a photo of the notice shown in FIG. 2B, the terminal displays the input box of "set valid time information" in the user interface, and if the time information inputted by the user is "Nov. 26, 2014," the terminal determines the received time information as the valid time information.

In step 206, it is detected whether an expiration time of the picture exceeds a first predetermined period according to the valid time information and the current time information.

The terminal subtracts the valid time indicated by the valid time information from the current time indicated by the current time information to obtain a difference value, and then compares the difference value with the first predetermined period. If the terminal finds that the difference value is greater than the first predetermined period, the terminal determines that the expiration time of the picture exceeds the first predetermined period, and executes step 207. If the terminal finds that the difference value is less than the first predetermined period, the terminal determines that expiration time of the picture does not exceed the first predetermined period, and stops the comparison procedure. The first predetermined period is positive, and may be set and modified by the terminal In step 207, the picture is deleted if it is detected that the expiration time of the picture exceeds the first predetermined period.

In this embodiment, the terminal may directly delete the picture which has an expiration time greater than the first predetermined period, so as to save storage space of the terminal. Alternatively or additionally, in order to avoid that the pictures are deleted without informing the user, which causes losing of important pictures, the terminal may prompt the user before deleting the pictures.

In this case, deleting the picture may include following steps:
1) generating and displaying a prompt message, receiving a deleting instruction triggered by the user according to the prompt message, and deleting the picture according to the deleting instruction, in which the prompt message is configured to prompt that the picture has expired; or
2) transferring the picture to a recycle buffer, obtaining a storage duration of the picture in the recycle buffer, and deleting the picture if the storage duration is greater than a second predetermined period; or, transferring the picture to the recycle buffer, receiving an emptying instruction for emptying the recycle buffer and deleting the picture according to the emptying instruction.

According to the first deleting way, the terminal may generate the prompt message after detecting that the expiration time of the picture exceeds the first predetermined period, and display the prompt message. When the user sees the prompt message and decides to delete the picture, he or she triggers the deleting instruction, and then the terminal deletes the picture according to the received deleting instruction. The prompt message may be "expiration time of picture x exceeds xx days, please delete it."

According to the second deleting way, the terminal may transfer the picture to the recycle buffer after detecting that the expiration time of the picture exceeds the first predetermined period, and count the storage duration of the picture in the recycle buffer. When the storage duration is greater than the second predetermined period, the terminal deletes the picture. For example, if the second predetermined period is seven days and the storage duration of the picture in the recycle buffer exceeds seven days, the terminal deletes the picture. The recycle buffer may be a recycle bin of the terminal Since the user may recover the picture in the recycle buffer during the second predetermined period, the problem that important information is lost caused by deleting the important picture directly is solved, thus enhancing the accuracy of deleting pictures.

After transferring the picture to the recycle buffer, the terminal may detect whether an emptying instruction triggered by the user for emptying the recycle buffer is received, and if the terminal detects that the emptying instruction is received, the terminal deletes the picture.

In conclusion, with the method for classifying pictures provided by the present disclosure, by obtaining pictures to be classified, by determining the class of each picture according to the feature information of the picture, in which the class includes the text picture class and the non-text picture class, and by classifying the pictures according to the class of each picture, the pictures may be classified in term of the text picture class and the non-text picture class, such that all the pictures in the text picture class are text pictures, which solves the problem of low view efficiency caused by separating the text pictures by the non-text pictures when the terminal displays the pictures according to their storage time, thus enhancing the efficiency of viewing the text pictures.

In addition, by adding each classified picture to the folder corresponding to the class of the picture and displaying the folders, or by adding each classified picture to the folding picture set corresponding to the class of the picture and displaying the folding picture sets, a variety of ways for displaying different classes of pictures are provided, thus enhancing the displaying variety.

In addition, by detecting whether the expiration time of the picture exceeds the first predetermined period according to the valid time information and the current time information and deleting the picture if the expiration time of the picture exceeds the first predetermined period, the expired picture may be deleted automatically, thus saving the storage space of the terminal.

Figure 3:
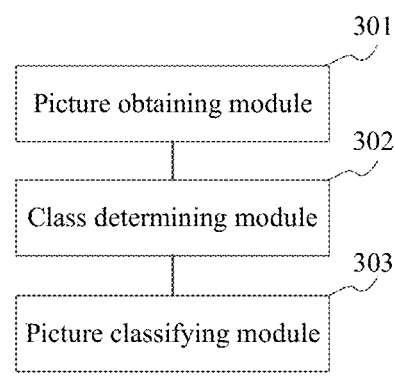
FIG. 3 is a block diagram of a device for classifying pictures according to an exemplary embodiment.

FIG. 3 is a block diagram of a device for classifying pictures according to an exemplary embodiment. The device for classifying pictures is applied in a terminal and as shown in FIG. 3, the device for classifying pictures includes a picture obtaining module 301, a class determining module 302 and a picture classifying module 303.

The picture obtaining module 301 is configured to obtain pictures to be classified.

The class determining module 302 is configured to determine a class of each picture according to feature information of the picture obtained by the picture obtaining module 301, in which the class includes a text picture class and a non-text picture class.

The picture classifying module 303 is configured to classify the pictures according to the class of each picture determined by the class determining module 302.

In conclusion, with the device for classifying pictures provided by the present disclosure, by obtaining pictures to be classified, by determining the class of each picture according to the feature information of the picture, in which the class includes the text picture class and the non-text picture class, and by classifying the pictures according to the class of each picture, the pictures may be classified in term of text picture class and non-text picture class, such that all the pictures in the text picture class are text pictures, which solves the problem of low view efficiency caused by separating the text pictures by the non-text pictures when the terminal displays the pictures according to their storage time, thus enhancing the efficiency of viewing the text pictures.

Figure 4:
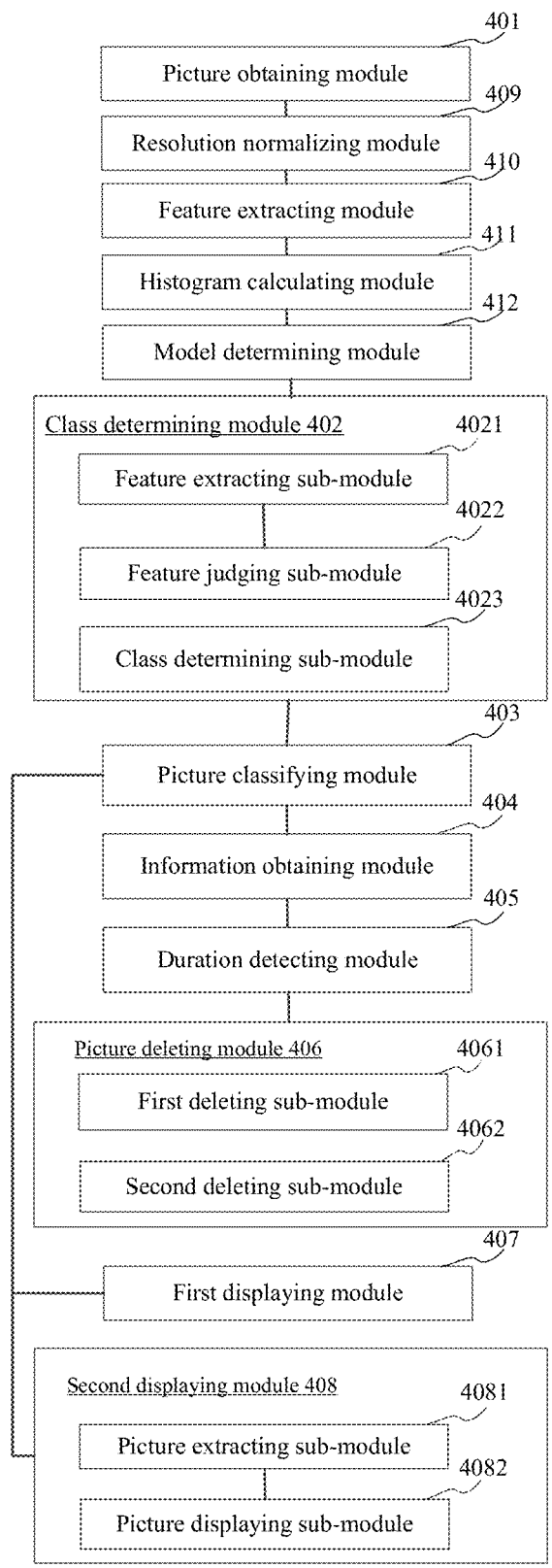
FIG. 4 is a block diagram of a device for classifying pictures according to an exemplary embodiment.

FIG. 4 is a block diagram of a device for classifying pictures according to an exemplary embodiment. The device for classifying pictures is applied in a terminal, and as shown in FIG. 4, the device for classifying pictures includes a picture obtaining module 401, a class determining module 402 and a picture classifying module 403. The methods, devices, and modules described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The picture obtaining module 401 is configured to obtain pictures to be classified.

The class determining module 402 is configured to determine a class of each picture according to feature information of the picture obtained by the picture obtaining module 401, in which the class includes a text picture class and a non-text picture class.

The picture classifying module 403 is configured to classify the pictures according to the class of each picture determined by the class determining module 402.

Alternatively or additionally, the device for classifying picture provided in this embodiment further includes an information obtaining module 404, a duration detecting module 405 and a picture deleting module 406.

The information obtaining module 404 is configured to obtain valid time information and current time information of the text information in the picture if the picture belongs to the text picture class.

The duration detecting module 405 is configured to detect whether an expiration time of the picture exceeds a first predetermined period according to the valid time information and the current time information obtained by the information obtaining module 404.

The picture deleting module 406 is configured to delete the picture if the duration detecting module 405 detects that the expiration time of the picture exceeds the first predetermined period.

Alternatively or additionally, the information obtaining module 404 is configured to: read the valid time information from a text recorded in the picture or receive inputted valid time information when storing the picture; and obtain the current time information.

Alternatively or additionally, the picture deleting module 406 includes a first deleting sub-module 4061 or a second deleting sub-module 4062.

The first deleting sub-module 4061 is configured to generate and display a prompt message, to receive a deleting instruction triggered by the user according to the prompt message, and to delete the picture according to the deleting instruction, in which the prompt message is configured to prompt that the picture has expired.

The second deleting sub-module 4062 is configured to transfer the picture to a recycle buffer, to obtain a storage duration of the picture in the recycle buffer, and to delete the picture if the storage duration is greater than a second predetermined period, or configured to transfer the picture to the recycle buffer, to receive an emptying instruction for emptying the recycle buffer, and to delete the picture according to the emptying instruction.

Alternatively or additionally, the device for classifying pictures provided in this embodiment further includes a first displaying module 407 or a second displaying module 408.

The first displaying module 407 is configured to add each classified picture to a folder corresponding to the class of the picture, and to display the folder.

The second displaying module 408 is configured to add each classified picture to a folding picture set corresponding to the class of the picture, and to display the folding picture set.

Alternatively or additionally, the second displaying module 408 includes a picture extracting sub-module 4081 and a picture displaying sub-module 4082.

The picture extracting sub-module 4081 is configured to extract a representation picture with the best quality from the folding picture set or to extract a representation picture with the latest storage time from the folding picture set.

The picture displaying sub-module 4082 is configured to display the representation picture of the folding picture set extracted by the picture extracting sub-module 4081 without displaying other pictures in the folding picture set, or configured to display the representation picture of the folding picture set and edge portions of other pictures.

Alternatively or additionally, the class determining module 402 includes a feature extracting sub-module 4021, a feature determining sub-module 4022 and a class determining sub-module 4023.

The feature extracting sub-module 4021 is configured to extract feature information of each pixel in the picture.

The feature determining sub-module 4022 is configured to determine the feature information extracted by the feature extracting sub-module 4021 according to a SVM model, in which the SVM model is obtained by training sample pictures, and the sample pictures include text pictures and non-text pictures.

The class determining sub-module 4023 is configured to determine the class of the picture according to a determining result of the feature determining sub-module 4022.

Alternatively or additionally, the device for classifying pictures provided in this embodiment further includes a resolution normalizing module 409, a feature extracting module 410, a histogram calculating module 411 and a model determining module 412.

The resolution normalizing module 409 is configured to normalize resolutions of the sample pictures to a predetermined resolution.

The feature extracting module 410 is configured to extract feature information of each pixel in each normalized sample picture.

The histogram calculating module 411 is configured to calculate a histogram of the feature information in each sample picture block, in which the sample picture block is obtained by dividing an area of the sample picture.

The model determining module 412 is configured to obtain the SVM model according to the types of the sample pictures and the histograms obtained by the histogram calculating module 411.

Alternatively or additionally, the feature information may include a Gabor feature value or a gradient direction value.

In conclusion, with the device for classifying pictures provided by the present disclosure, by obtaining pictures to be classified, by determining the class of each picture according to the feature information of the picture, in which the class includes the text picture class and the non-text picture class, and by classifying the pictures according to the class of each picture, the pictures may be classified in term of text picture class and non-text picture class, such that all the pictures in the text picture class are text pictures, which solves the problem of low view efficiency caused by separating the text pictures by the non-text pictures when the terminal displays the pictures according to their storage time, thus enhancing the efficiency of viewing the text pictures.

In addition, by adding each classified picture to the folder corresponding to the class of the picture and displaying the folders, or by adding each classified picture to the folding picture set corresponding to the class of the picture and displaying the folding picture sets, a variety of ways for displaying different classes of pictures are provided, thus enhancing the displaying variety.

In addition, by detecting whether the expiration time of the picture exceeds the first predetermined period according to the valid time information and the current time information and deleting the picture if the expiration time of the picture exceeds the first predetermined period, the expired picture may be deleted automatically, thus saving the storage space of the terminal.

With respect to the devices in the above embodiments, the specific operation modes of individual modules therein have been described in detail in the embodiments regarding the methods for classifying pictures, which will not be elaborated herein.

Exemplary embodiments of the present disclosure provide a device for classifying pictures, which can realize the methods for classifying pictures provided by the present disclosure. The device for classifying pictures includes a processor and a memory configured to store instructions executable by the processor. The processor is configured to:
  obtain one or more pictures to be classified;
  determine a class of each picture according to feature information of the picture, in which the class includes a text picture class and a non-text picture class;
  classifying the pictures according to the class of each picture.

Figure 5:
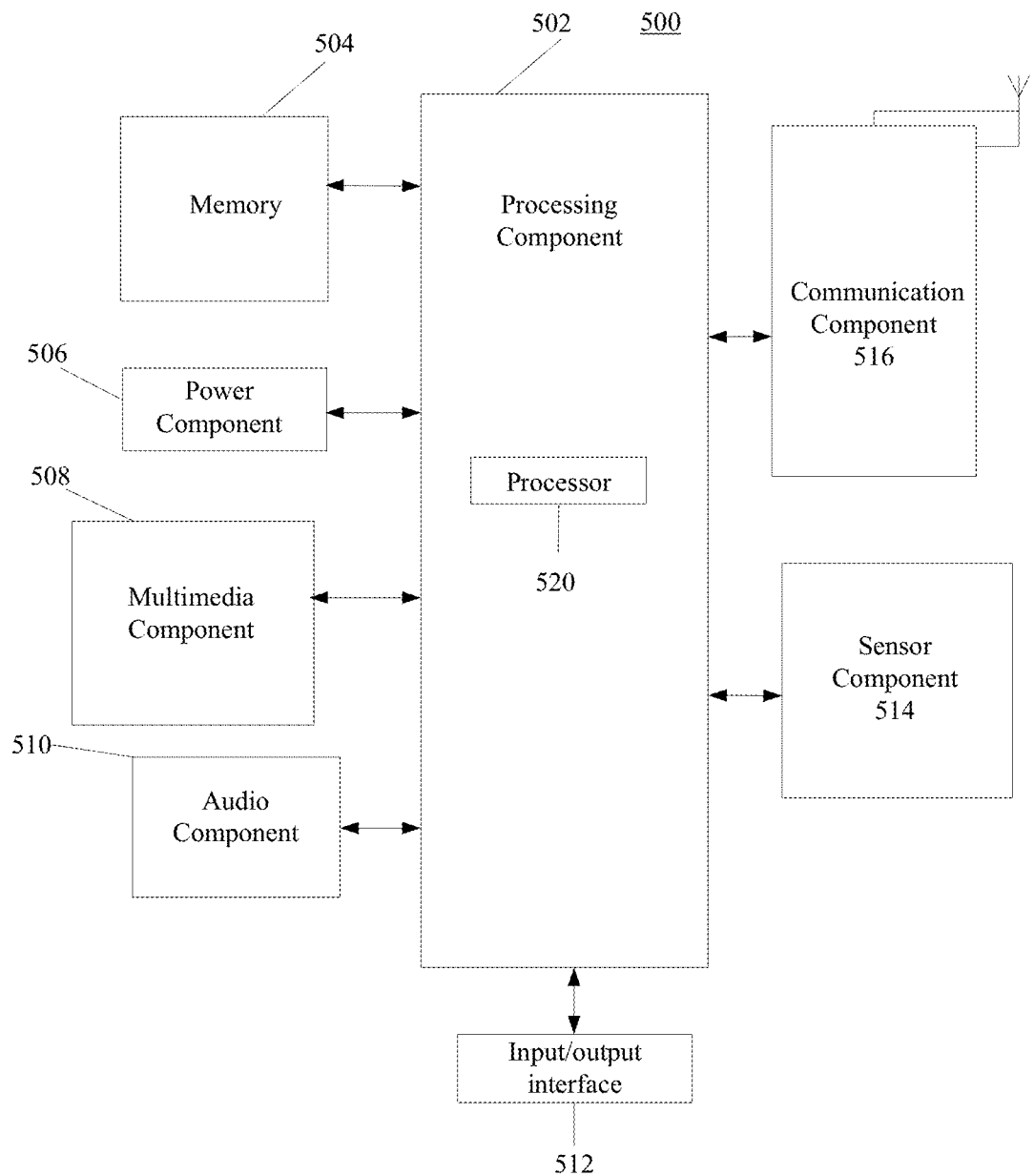
FIG. 5 is a block diagram of a device for classifying pictures according to an exemplary embodiment.

FIG. 5 is a block diagram of a device 500 for classifying pictures according to an exemplary embodiment. For example, the device 500 may be a mobile phone, a computer, a digital broadcast terminal, a message transceiver, a game console, a tablet, a medical device, an exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516. Each component may include one or more circuitries.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 508 includes a front camera and/or a rear camera. The front camera and the rear camera may receive external multimedia data while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500 and relative positioning of components (e.g., the display and the keypad of the device 500). The sensor component 514 may also detect a change in position of the device 500 or of a component in the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate wired or wireless communication between the device 500 and other devices. The device 500 can access a wireless network based on a communication standard, such as WiFi, 2G, or 3G, or a combination thereof In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 504 including instructions. The above instructions are executable by the processor 518 in the device 500, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present invention is not limited to the exact embodiments that has been described above and illustrated in the accompanying drawings, and that various modifications and changes can be made without departing from the scope thereof. It is intended that the scope of the invention only be limited by the appended claims.

What is claimed is:

1. A method for classifying pictures, comprising:
   obtaining, by a device comprising a processor, a picture to be classified;
   determining, by the device, a class of the picture according to feature information of the picture, wherein the class comprises a text picture class and a non-text picture class; and
   classifying, by the device, the picture according to the class of the picture;
   after classifying the picture according to the class of the picture, the method further comprising at least one of:
   adding the classified picture to a folder corresponding to the class of the picture and displaying the folder; and
   adding the classified picture to a folding picture set corresponding to the class of the picture and displaying the folding picture set.

2. The method according to claim 1, further comprising:
   if the picture belongs to the text picture class, obtaining valid time information and current time information of text information in the picture;
   detecting whether an expiration time of the picture exceeds a first predetermined period according to the valid time information and the current time information; and
   if yes, deleting the picture.

3. The method according to claim 2, wherein obtaining valid time information and current time information of text information in the picture comprises:
   reading the valid time information from a text recorded in the picture or receiving inputted valid time information when storing the picture; and
   obtaining the current time information.

4. The method according to claim 2, wherein deleting the picture comprises one of the following:
   generating and displaying a prompt message, receiving a deleting instruction triggered by a user according to the prompt message, and deleting the picture according to the deleting instruction, wherein the prompt message is configured to prompt that the picture has expired;
   transferring the picture to a recycle buffer, obtaining a storage duration of the picture in the recycle buffer, and deleting the picture if the storage duration is greater than a second predetermined period; and
   transferring the picture to the recycle buffer, receiving an emptying instruction for emptying the recycle buffer, and deleting the picture according to the emptying instruction.

5. The method according to claim 1, wherein displaying the folding picture set comprises:
   extracting a representation picture with a best quality from the folding picture set or extracting a representation picture with a latest storage time from the folding picture set; and
   displaying the representation picture of the folding picture set without displaying other pictures in the folding picture set, or displaying the representation picture of the folding picture set and edge portions of the other pictures.

6. The method according to claim 1, wherein determining the class of the picture according to feature information of the picture comprises:
   extracting feature information of each pixel in the picture;
   determining the feature information according to a Support Vector Machine model, wherein the Support Vector Machine model is obtained by training sample pictures, and the sample pictures comprise text pictures and non-text pictures; and
   determining the class of the picture according to a determining result.

7. The method according to claim 6, further comprising:
   normalizing resolutions of the sample pictures to a predetermined resolution;
   extracting feature information of each pixel in each normalized sample picture;
   calculating a histogram of each sample picture block, wherein the sample picture block is obtained by dividing an area of the sample picture; and
   obtaining the Support Vector Machine model according to types of the sample pictures and the histograms.

8. The method according to claim 1, wherein the feature information comprises a Gabor feature value or a gradient direction value.

9. A device for classifying pictures, comprising:
a processor;
a memory configured to store instructions executable by the processor;
wherein the processor is configured to:
obtain a picture to be classified;
determine a class of the picture according to feature information of the picture, wherein the class comprises a text picture class and a non-text picture class; and
classify the picture according to the class of the picture;
wherein the processor is further configured to:
add the classified picture to a folder corresponding to the class of the picture and display the folder; or
add the classified picture to a folding picture set corresponding to the class of the picture and display the folding picture set.

10. The device according to claim 9, wherein the processor is further configured to:
if the picture belongs to the text picture class, obtain valid time information and current time information of text information in the picture;
detect whether an expiration time of the picture exceeds a first predetermined period according to the valid time information and the current time information; and
if yes, delete the picture.

11. The device according to claim 10, wherein the processor is further configured to obtain valid time information and current time information of text information in the picture by:
reading the valid time information from a text recorded in the picture or receiving inputted valid time information when storing the picture; and
obtaining the current time information.

12. The device according to claim 10, wherein the processor is further configured to delete the picture by using one of the following acts:
generating and displaying a prompt message, receiving a deleting instruction triggered by a user according to the prompt message, and deleting the picture according to the deleting instruction, wherein the prompt message is configured to prompt that the picture has expired;
transferring the picture to a recycle buffer, obtaining a storage duration of the picture in the recycle buffer, and deleting the picture if the storage duration is greater than a second predetermined period; and
transferring the picture to the recycle buffer, receiving an emptying instruction for emptying the recycle buffer, and deleting the picture according to the emptying instruction.

13. The device according to claim 9, wherein displaying the folding picture set comprises:
extracting a representation picture with a best quality from the folding picture set or extracting a representation picture with a latest storage time from the folding picture set; and
displaying the representation picture of the folding picture set without displaying other pictures in the folding picture set, or displaying the representation picture of the folding picture set and edge portions of the other pictures.

14. The device according to claim 9, wherein the processor is configured to determine the class of the picture according to feature information of the picture by:
extracting feature information of each pixel in the picture;
determining the feature information according to a Support Vector Machine model, wherein the Support Vector Machine model is obtained by training sample pictures, and the sample pictures comprise text pictures and non-text pictures; and
determining the class of the picture according to a determining result.

15. The device according to claim 14, wherein the processor is further configured to:
normalize resolutions of the sample pictures to a predetermined resolution;
extract feature information of each pixel in each normalized sample picture;
calculate a histogram of each sample picture block, wherein the sample picture block is obtained by dividing an area of the sample picture; and
obtain the Support Vector Machine model according to types of the sample pictures and the histograms.

16. The device according to claim 9, wherein the feature information comprises a Gabor feature value or a gradient direction value.

17. A non-transitory computer-readable storage medium having stored therein instructions that, when executed by a processor of a terminal device, causes the terminal device to perform acts comprising:
obtaining a picture to be classified;
determining a class of the picture according to feature information of the picture, wherein the class comprises a text picture class and a non-text picture class; and
classifying the picture according to the class of the picture;
wherein the terminal device is further caused to perform at least one of:
adding the classified picture to a folder corresponding to the class of the picture and displaying the folder; and
adding the classified picture to a folding picture set corresponding to the class of the picture and displaying the folding picture set.

18. The non-transitory computer-readable storage medium according to claim 17, wherein the instructions further causes the terminal to:
extract feature information comprising a Gabor feature value or a gradient direction value from sample pictures of different classes; and
obtain a Support Vector Machine model by training the sample pictures using the extracted feature information that comprises the Gabor feature value or the gradient direction value.

* * * * *